Patented Apr. 6, 1943

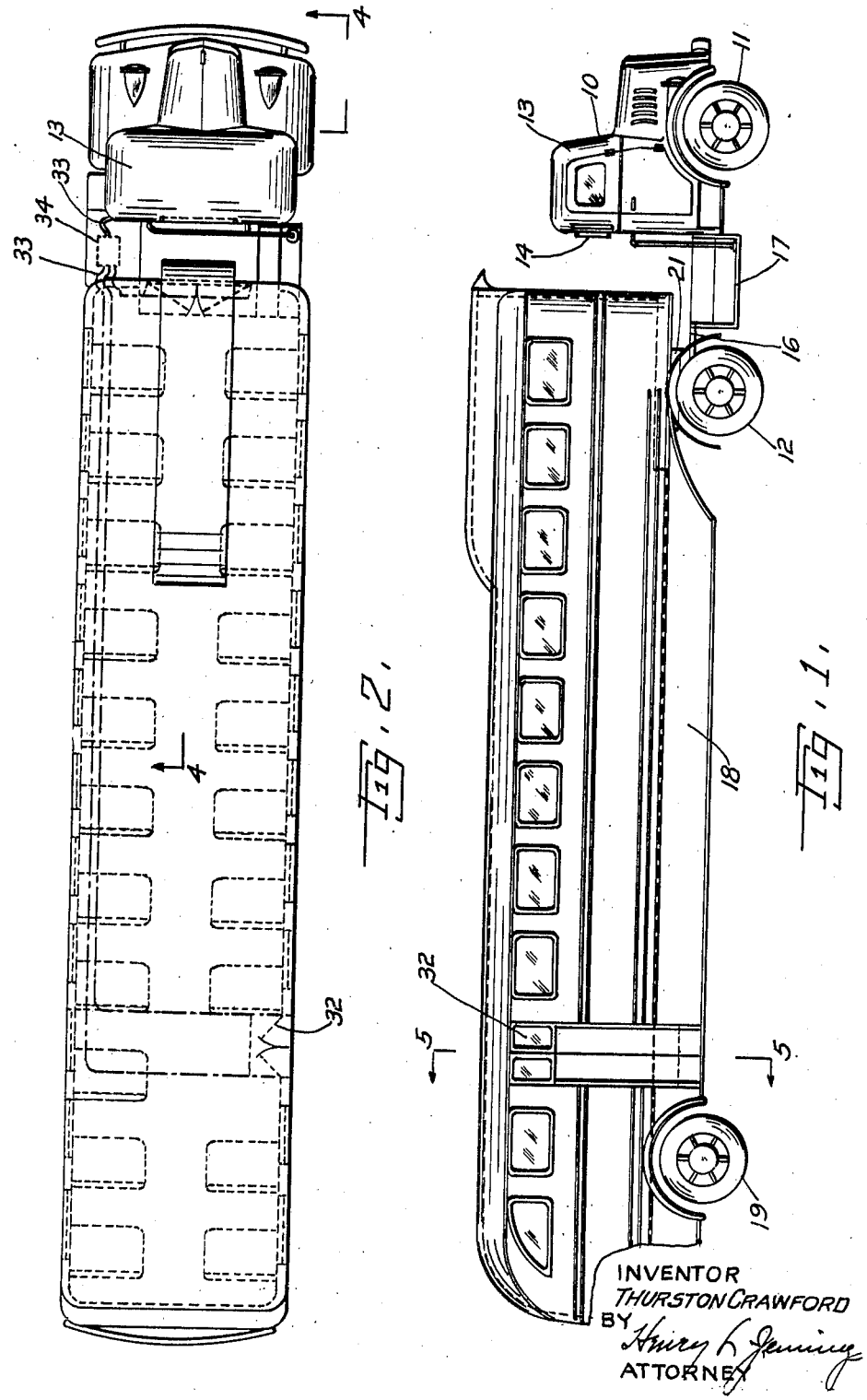

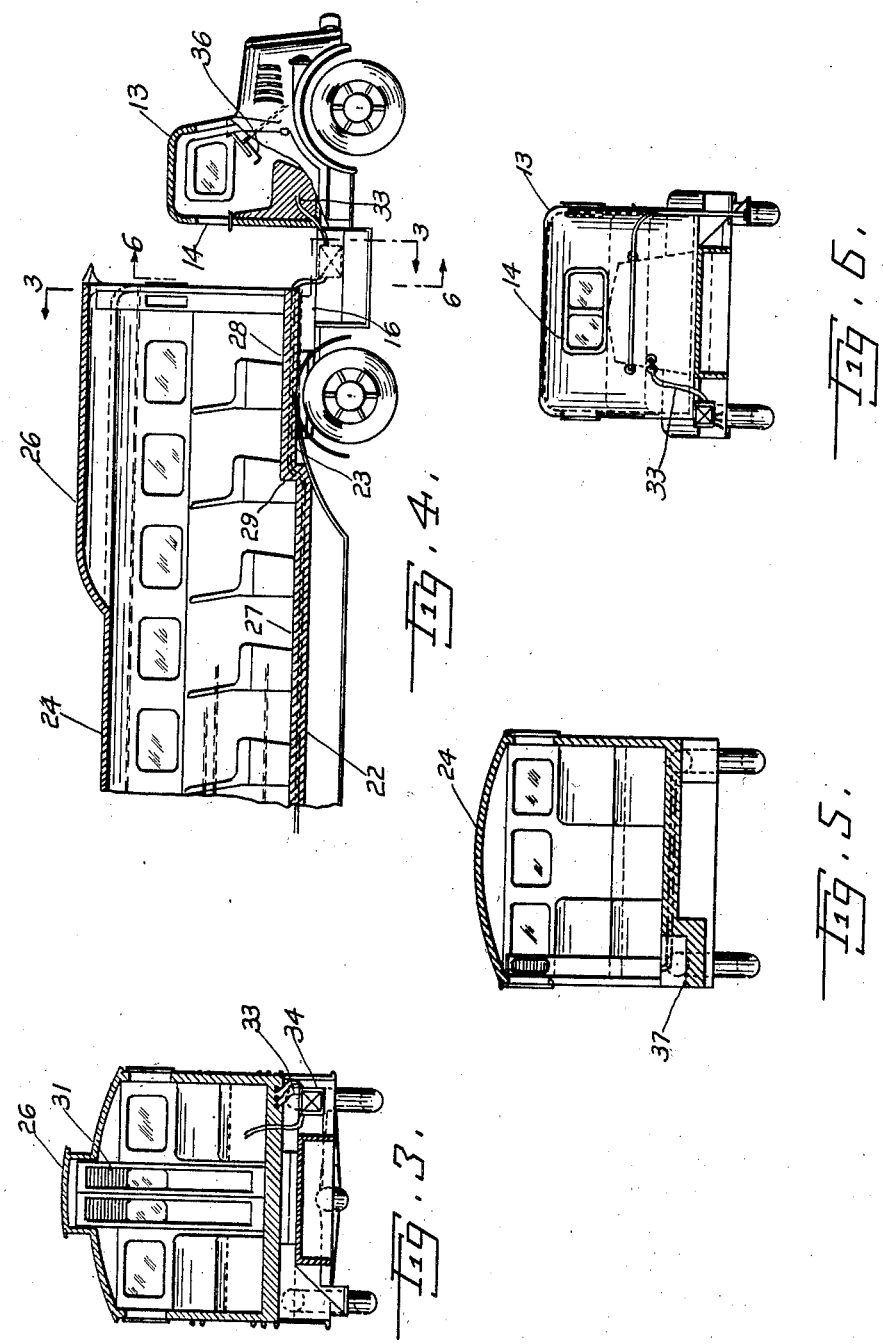

2,315,688

UNITED STATES PATENT OFFICE 2,315,688

BUS

Thurston Crawford, Columbus, Ga.

Application October 14, 1941, Serial No. 414,973

2 Claims. (Cl. 280—33.1)

My invention relates to passenger buses, more particularly to buses of the semi-trailer type embodying a tractor unit and a trailer unit, and has for an object the provision of apparatus of the character designated which shall be adapted for the frequent pickup and discharge of passengers and the collection of fares therefrom, which details may be attended to by the driver of the vehicle without the necessity of a fare collector.

A further object of my invention is to provide a passenger bus of the type embodying a tractor unit with a driver's cab and a trailer unit overhanging the tractor unit, in which means are provided for entering the trailer unit from the tractor unit in close proximity to the driver, and in which there is an exit door toward the rear of the trailer unit.

Semi-trailer type buses have heretofore been employed for carrying passengers, but due to their peculiar construction their use has been limited to service in which a fare collecting conductor, in addition to the driver, was employed, or else they have been used for such purposes as for hauling sight seeing parties and other similar special groups where the continued taking on of passengers, collection of fares, and discharge of passengers was not necessary. In accordance with my invention, I provide a tractor unit and a trailer body connected thereto by a fifth wheel articulate connection so that the front of the trailer unit overhangs the tractor unit. A driver's cab is mounted toward the front of the tractor unit, and a platform is provided at the rear of the cab adjacent the overhanging end of the trailer unit. A window is provided in the rear of the driver's cab and a door in the front of the trailer unit. Steps for passengers to mount the platform are provided, and as the passengers enter the front door of the trailer unit they pay their fares to the driver. The frame of the trailer unit is offset upwardly toward the front to overhang the tractor, and the roof over the offset portion is raised to provide head room. An exit door is provided at the rear of the trailer unit, and means are provided for operating both doors from the driver's cab.

Apparatus embodying features of my invention is illustrated in the accompanying drawings forming a part of this application, in which Fig. 1 is a side elevation of a bus constructed in accordance with my invention;

Fig. 2 is a plan view of the same;

Fig. 3 is a sectional view taken along the line 3—3 of Fig. 4 and showing the front entrance in elevation;

Fig. 4 is a sectional view taken along the line 4—4 of Fig. 2;

Fig. 5 is a sectional view through the rear exit door and taken along the line 5—5 of Fig. 1; and Fig. 6 is a sectional view taken along the line 6—6 of Fig. 4, looking toward the rear of the driver's cab.

Referring to the drawings, my improved bus comprises a tractor unit 10 having front wheels 11 and rear wheels 12. A driver's cab 13 is mounted toward the front of the tractor unit, and is provided at its rear with a sliding window 14 through which fares may be collected. To the rear of the cab 13 is a passenger platform 16. Suitable steps 17 are provided for passengers to mount the platform 16, and it will be seen that when they mount the platform 16 they are immediately to the rear of the sliding window 14.

At 18 I show a trailer unit having rear wheels 19 only, and articulately connected to the tractor unit 10 by a fifth wheel connection 21. As will be seen in Figs. 2 and 4, the forward end of the trailer unit 18 overhangs the passenger platform 16. In order to provide for as low a center of gravity as possible, the main frame of the trailer unit shown at 22 in Fig. 4 extends for the major portion of the length of the trailer unit below the platform 16, and is offset upwardly at 23 to overhang the platform 16. The roof of the trailer unit is shown at 24 and, as shown in Figs. 1, 3 and 4, is provided with a raised forward portion 26 over the upwardly offset portion 23 of the main frame. The floor of the trailer unit, indicated generally at 27, is raised, as shown at 28, beneath the raised portion 26 of the roof. A step 29 inside the trailer unit permits passengers to step down to the lower level of the floor 27.

The entrance to the trailer unit is in the forward end, which is provided with pneumatically operated doors 31. It will be noted that the doors 31 are immediately to the rear of the window 14, so that passengers pass the window 14 in entering the trailer unit. Exit doors 32 are provided at the rear of the trailer unit. The entrance doors 31 and the exit doors 32 are of the well known pneumatically operated type, which requires no detailed description. Air conduits 33 lead from the cab 13 through a coupling box 34 mounted on the tractor unit, and underneath the floor of the trailer unit 18 to convey the necessary air under pressure for operation to the doors. A suitable valve 36 in the driver's cab 13 permits the doors 31 and 32 to be operated from the cab.

From the foregoing it will be seen that I have devised an improved bus construction which combines the passenger carrying capacity of the trailer type with adaptability for operation by the driver of the vehicle without the assistance of a fare collector. Passengers entering the trailer unit 18 from the front mount the platform 16 by means of the steps 17 and pay their fares to the driver before entering the doors 31. When necessary to discharge passengers, the driver, having control of the doors 31 and 32, opens the doors 32 and permits them to descend by means of steps 37.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a passenger bus, a tractor unit having front and rear wheels, a trailer unit having rear wheels only, a fifth wheel connection between the front end of the trailer unit and the tractor unit, an underframe for the trailer unit having an upward offset toward the front to overhang the tractor unit, a roof for the trailer unit having a raised portion over the offset portion of the frame, a passenger platform on the tractor unit forward of the overhanging end of the trailer unit, steps on the tractor unit leading to the platform, a front entrance door in the forward end of the trailer unit and an exit door toward the rear of the trailer unit, a driver's cab in front of the passenger platform, and a window in the rear of the driver's cab opposite the entrance door for the collection of fares.

2. In a passenger bus, a tractor unit having front and rear wheels, a trailer unit having rear wheels only, a fifth wheel connection between the front end of the trailer unit and the tractor unit, an underframe for the trailer unit having an upward offset toward the front to overhang the tractor unit, a floor in the trailer unit having a raised portion over the upward offset, a roof for the trailer unit having a raised portion over the raised portion of the floor, a passenger platform on the tractor unit forward of and below the overhanging end of the trailer unit, steps on the tractor unit leading to the platform, a front entrance door in the front end of the trailer unit and an exit door toward the rear of the trailer unit, a driver's cab in front of the passenger platform opposite the entrance door, and a window in the rear of the driver's cab for the collection of fares.

THURSTON CRAWFORD.